July 28, 1942.  J. J. STONE  2,291,196
CUTTER-GUIDING FINGER FOR GRINDERS
Filed Aug. 2, 1940
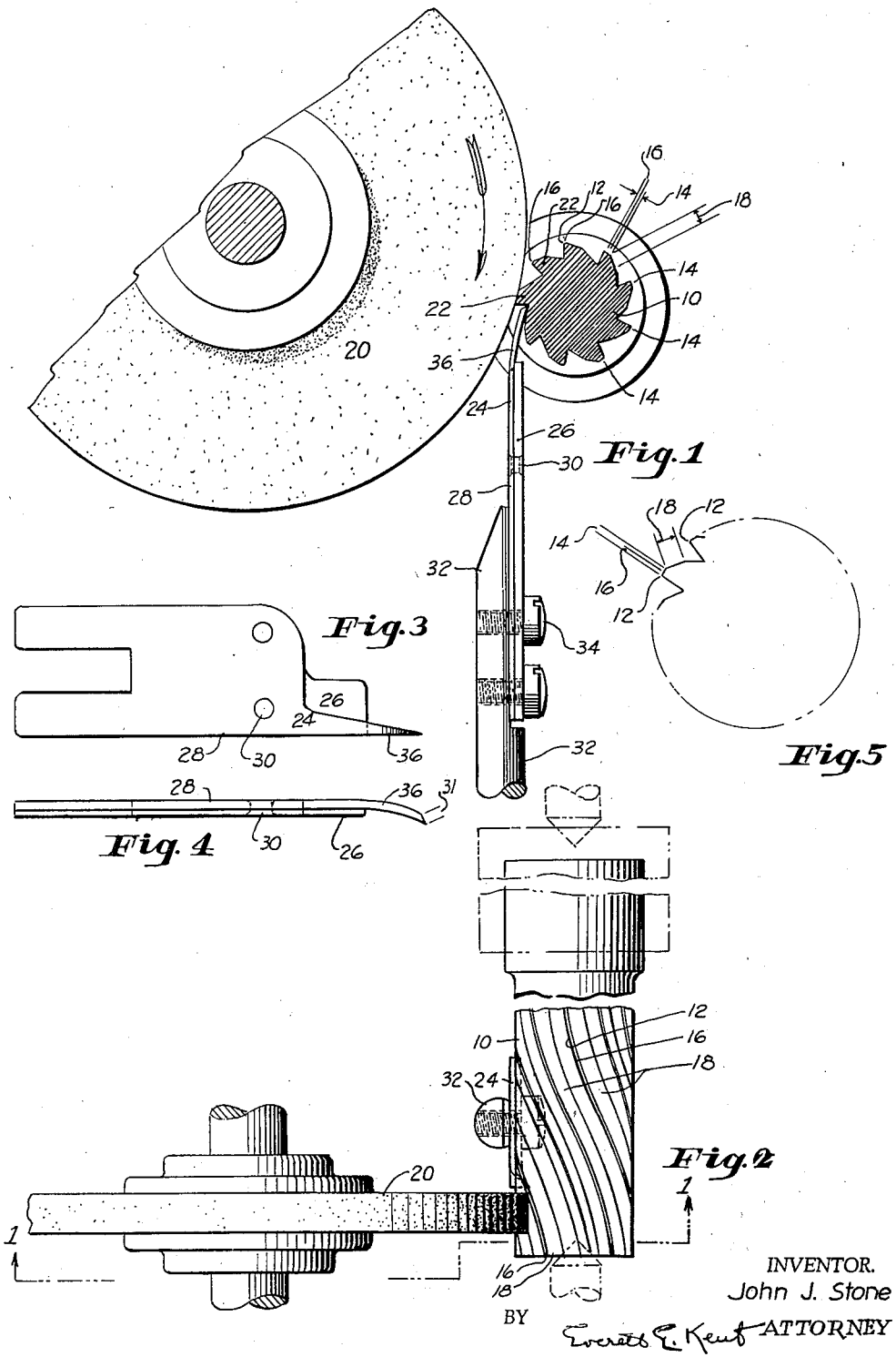
INVENTOR.
John J. Stone
BY Everett E. Kent ATTORNEY Patented July 28, 1942

2,291,196

UNITED STATES PATENT OFFICE 2,291,196

CUTTER-GUIDING FINGER FOR GRINDERS

John J. Stone, Framingham, Mass., assignor to Champion Grinding Fixtures Company, Somerville, Mass., a corporation of Massachusetts Application August 2, 1940, Serial No. 349,563

3 Claims. (Cl. 51—236)

This invention relates to improvements in cutter-guiding fingers for grinders.

More particularly it relates to apparatus for guiding the grinding of clearances, in finishing the re-sharpening of cutting tools,—such as reamers and other cylindrical or conical cutting tools having straight or helical teeth separated by flutes. The purpose is to reduce the land behind each cutting edge to a width which is uniform and very narrow.

When a tool of this class, herein for convenience referred to generically as a "cutter," is rotarily ground down to sharpness, and down to desired size, each tooth crest between flutes is left in the form of a short cylindrical arc. This arc is a temporary land that runs back from the cutting edge to where the clearance begins, whence the back of the tooth slopes more or less steeply down into the hollow of the flute next behind that tooth. The clearance must then be extended forward closer to the cutting edge, until only a very narrow bit of the crestarc is left, to constitute the land of the finished cutter. The land, having the same diameter as the cutting edge, operates as a drag when the cutter is at work by rubbing on the freshly cut surface. Therefore in practice the finished land is sometimes required to be as narrow as .002 inch. And lack of uniformity in width may affect seriously the behavior of the cutter. An extra width of land may break the cutter, and an irregularity may spoil the work, as a nick in the edge might do. Hitherto there has been such extreme difficulty and uncertainty in making the lands uniform, in a re-sharpening job, that it is frequent practice to abandon a cutter when its initial edges have become dull; and to make replacement by purchase of a new cutter. The present invention avoids this important waste. It provides so that the men working at tool grinding, in the various shops where cutters are used, can re-sharpen cutters with lands of requisite uniformity and narrowness; and this makes it practicable to continue the use of cutters, repeatedly, until the teeth have become too short to be again re-sharpened.

For reducing the lands left by the rotary grinding of the cutter, a grinding wheel has to operate along the sloping back of each tooth. In one way of doing this, the grinding wheel stands rotating in a stationary position behind the cutter, which is mounted in front of it, on centers; and, as the cutter is fed past the grinding wheel, the workman must by hand turn the cutter, and hold it, on its centers, so that the grinding operates on the back of the tooth; pressing enough, but not too much, for the area of ground clearance to become extended forward the correct distance for reducing the land to the desired uniform small width.

This is a delicate matter, especially difficult with all cutters whose flutes are helical or otherwise curved; and it is particularly so since the workman cannot see the place where the grinding wheel is operating. The ideal, not hitherto attainable satisfactorily in re-sharpening, is to make the land so narrow that it looks like a mere line, of uniform width, separating the cutting edge from the sloping back which is the clearance. By the invention it is possible to attain this ideal.

Each flute in the cutter is a groove, whose rear wall is a face or abutment that rises, more or less radially, to the crest which is the land whose leading edge is the cutting edge of a tooth. The clearance grinding of the back of this tooth can conveniently be managed when the tooth-face abutment stands out horizontally, and the grinding wheel is centered behind and a little above the axis of the cutter. So positioned a guiding finger can stand vertically upward against the tooth-face to help the workman sense the location of the tooth as he spirals the cutter along past the grinder. The finger stands close beside the working edge of the grinding wheel, reaching up almost between the circles of grinder and of cutter, so that its end can bear up against said abrupt face, at whose crest is the temporary land whose rear portion is to be reduced. When the grinder is thus working on the back of that tooth it occupies a position in which it has nearly the relation of a circle tangent to the outer circle of the cutter; and its grinding the back of the tooth presses the face of the tooth down on the end of the finger; with varying force. The workman presses the cutter rotarily against the finger with varying force, while endeavoring to follow the helical course of the tooth; and the finger yields, to varying degrees, thus destroying the uniformity of width of the land. With guide fingers hitherto available it has been found impracticable by this means to maintain uniform position of the work against the wheel.

Having finished one tooth the workman turns the cutter backward on its centers, and so springs the finger over the tooth which is next forward. The finger therefore must be elastic, and must yield rather easily, for if it is too stiff it may nick the cutting edge as it passes. Therefore the finger is both long and slender.

The present invention, to attain its purpose, makes the finger so stiffly resistant, to the pressure of the workman and to the drag of the grinder wheel's attack on the work, that the finger is able to hold the cutter without yielding, regardless of the variations in these two sources of pressure. Hence it provides uniformity in the closeness with which the grinder can make the clearance approach the cutting edge. Yet, contradictorily, the invention leaves the finger as gently flexible as it previously was, so that it can snap over the cutting edge of a tooth without nicking that edge.

The invention accomplishes this contradiction by providing a slender finger, such as those previously used, with a point which assures its settling into the depth of the groove, when the cutter is turned forward toward the finger, and assures that the working pressure on the finger will tend to bend the finger toward that side which is toward the axis of the cutter; and further provides the finger with a stiff plate which backs a large part of the length of the finger, on that said side of the finger, from its base to near its point, so that the short length of finger which remains unbacked, at the point portion, is too stiff to yield to the integrated effect of the drag of the grind wheel and the manipulative effort of the workman; and yet the actual attachment of that plate to the finger is so remote from the working point of the finger that, for bending outward from the cutter, to snap over a tooth into the next groove, the finger can yield with that same elastic flexibility which such fingers have hitherto had, without injuring the tooth.

The manner of accomplishing this is indicated in the description which follows, reference being had to the accompanying drawing which illustrates an embodiment.

It is intended that the patent shall cover, by suitable expression in the appended claims, whatever features of patentable novelty are disclosed herein.

In the accompanying drawing, on a scale larger than actual dimensions:

Figure 1 is an edge elevation of the guiding finger in service while clearance is being ground on a cutter, represented as in section on 1—1 of Figure 2;

Figure 2 is a plan of the same;

Figure 3 is a view of the guiding finger on the side remote from the cutter;

Figure 4 is an edge elevation of the same; and

Figure 5 is a diagram illustrating the land and clearance of a tooth of the cutter.

Referring to the drawing, 10 indicates a cutter which is in process of being finished in the course of a re-sharpening operation. It is assumed that the cutting edges 12 of the cutter have been made sharp and are at desired diameter, by a grinding operation applied to the fluted portion of the cutter, while the cutter is rotating, leaving a short cylindrical surface 14 back of each cutting edge, this being a land which is too wide and which must be reduced in width to something of the order of the thickness of a sheet of paper, say in the range from .002 to .01 inch. In the drawing, the lines representing the land 14, left by the rotary grinding operation, and the land 16 to which the lands 14 are to be reduced by the apparatus of the invention, are much exaggerated for clearness of showing. The effect of the clearance grinding with which the invention is concerned is illustrated in Figures 5 and 1. It is to cut away a part of the land 14 left by the rotary grinding, this land grinding being on a surface which is secant to the land, increasing the clearance 18. The grinding is done by any suitable grinding wheel 20, which rotates about an axis parallel to the axis of the cutter and works along the back side of each tooth 22, singly, and then moves to the next forward tooth. To set and hold the work against the grinding wheel all along the length of the tooth one hand of the workman is used; and the invention relieves him of having to judge, and to control his muscles to execute, just how much pressure is needed to make the clearance grinder approach the edge of the tooth closely enough, and not too closely, at each part of the length of the tooth. The finger 24 provides sufficient resistance so that all the workman need do is to turn the cutter with pressure enough to maintain contact of the face of the tooth against that finger. Then the limit of clearance made will be determined by the adjustment of distance between axes of cutter and of grinder.

That adjustment and the setting of the finger 24 remaining fixed during each traverse of the tooth past the grinder, the clearance will have a forward limit which is uniformly distant from the face of the tooth; and the land back of the cutting edge will be free from the vice of wavering in width.

The supporting plate 26, introduced into the combination by the invention, is firmly secured to the base part 28 of the finger 24, and there held by rivets or spot welding 30, or by any other suitable means. That portion of the finger which makes contact with the cutter is long and slender, rising from a base portion, which is suitably broad for securement, in the holder 32, as by screws 34; and the supporting plate 26 may be equally broad for convenience of firm securement by the rivets 30 or otherwise. But the base part 28 of the finger is not without a small measure of elastic flexibility, and it is not attached to the plate 26 between those rivets and the point of its finger. Thus all that part of the finger and its base between the rivets 30 and the point is free to bend away from the supporting plate 26, with the freedom which pertains to whatever length and slenderness of finger and quality of base is there provided. Therefore the guiding finger of the invention is able to be sprung backward, away from the cutter, in order to snap over the edge of the tooth in the cutter without injuring it, as it has been under former construction.

But the finger is combined with a supporting plate 26, which lies parallel with and close against the upper part of the base and the lower part of the slender portion of the finger, and is stiff enough to resist bending in the opposite direction, that is, forward toward the axis of the cutter. This leaves only the short tip portion 36 of the slender part of the finger 24, which is theoretically free to bend, being the part beyond the end of plate 26; and I make this portion of the finger so shaped that the pressure of the work on it tends to bend it forward, over the end of the plate 26, and inherently so stiff that it does not bend at all, under pressure applied to it by the face of the tooth whose back is being ground. I shape the tip portion of finger 24 with a curve over the end of plate 26, forward toward the axis of the cutter; and I bevel its end 31 at an acute angle, for which 30° is suitable, so that when the face of a tooth is resting against it there will be no tendency for it to slip outward over the crest, even if the tooth has been re-ground so much as to have become very low, but pressure of the tooth face will tend to move it toward the depth of the flute. I harden the steel at the point but draw it so that it is elastic back of the point and can be sprung backward. With the said shape of tip and setting of grinder and cutter, both the pressure of the workman and the drag of the grinding wheel, reaching the finger through the base part of the front face of the tooth, tend to bend the finger forward over the end of the plate 26. As the finger cannot thus bend, the position of the cutter with reference to the grinder remains firm, all along the tooth; and the edge of the clearance thus ground is uniformly distant from the front face of the tooth, however close thereto it may be.

In consequence it is easily practicable to execute the grinding of the clearance so that only a hair line of land is left back of the cutting edge, and so that this is possessed of a pleasing uniformity of width throughout the length of the tooth of the cutter.

Having thus ground the clearance for a tooth, the workman runs the cutter past the wheel until the grinding wheel is off the end of the cutter, while the guiding finger, very close by, still remains in its flute. Then he turns the cutter the necessary fraction of a revolution to pass the finger over the next forward tooth into the next flute; turns the cutter so that the finger is against the abutment of that next tooth, and thus has the grinding wheel perfecly positioned for adjustment to desired depth of cut for grinding clearance of that next tooth,—which can proceed with the working position of the grinder guided by the said finger without the variation hitherto experienced.

A cutter thus reconditioned with uniform very narrow land is in perfect working condition to do good work, according to its nature, without risk hitherto experienced that its work would be defective or that it would itself be injured because of irregularities in its clearance.

I claim as my invention:

1. A cutter-guiding finger for a cutter-grinder, said finger being one having a tip end for contacting the front of a cutter-tooth during the grinding of its back clearance; and being a finger which is endwise stiff, and is laterally springy; having a relatively broad basal portion by which it is adapted to be held firmly in operating position and having a relatively narrow and more flexible part projecting from said broad base to the tip, the said narrow projecting part being free from obstacle against springing laterally outward from the body of the cutter,—there being, on that side of the finger which is toward the body of the cutter, a laterally stiff supporting plate overlying the basal portion and also overlying a portion of the narrow and more flexible part, and extending outward to a location which is between the end of the basal portion and the said tip, for bearing against the narrow and more flexible part at said location, whereby a differential of resistance to lateral springing of the finger is produced, as between its bending toward the cutter body and its bending from the cutter body.

2. A cutter-guiding finger as in claim 1 in which the held part of the finger is integral with the said projection thereof, and the said overlying part of the stiff lateral plate support has breadth greater than the breadth of the laterally-springy projecting part of the finger beside it, whereby the support has relatively large stiffness with relatively small thickness.

3. A cutter-guiding finger as in claim 1, in which the finger, at its tip region, is offset from the plane of the body of the finger, in direction toward the cutter, and at its tip is bevelled at an acute angle pointing in that direction.

JOHN J. STONE.